(12) United States Patent
Shukh et al.

(10) Patent No.: US 6,477,007 B1
(45) Date of Patent: Nov. 5, 2002

(54) PLANAR WRITER FOR MERGED GMR RECORDING HEAD

(75) Inventors: Alexander M. Shukh, Savage, MN (US); Edward S. Murdock, Edina, MN (US); Steven A. Mastain, Chanhassen, MN (US); James K. Price, Tonka Bay, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 131 days.

(21) Appl. No.: 09/649,985

(22) Filed: Aug. 29, 2000

Related U.S. Application Data

(60) Provisional application No. 60/175,568, filed on Jan. 11, 2000, and provisional application No. 60/176,168, filed on Jan. 13, 2000.

(51) Int. Cl.$^7$ .............................................. G11B 5/147
(52) U.S. Cl. ..................................................... 360/126
(58) Field of Search ................................. 360/126, 123, 360/122, 318

(56) References Cited

U.S. PATENT DOCUMENTS

| | | | |
|---|---|---|---|
| 4,743,988 A | 5/1988 | Sato et al. | 360/126 |
| 5,283,942 A | 2/1994 | Chen et al. | 29/603 |
| 5,452,164 A | 9/1995 | Cole et al. | 360/113 |
| 5,546,650 A | 8/1996 | Dee | 29/603.16 |
| 5,621,596 A | 4/1997 | Santini | 360/126 |
| 5,640,753 A | 6/1997 | Schultz et al. | 29/603.08 |
| 5,652,687 A | 7/1997 | Chen et al. | 360/126 |
| 5,668,689 A | 9/1997 | Schultz et al. | 360/113 |
| 5,699,605 A | 12/1997 | Amin et al. | 29/603.14 |
| 5,793,577 A | 8/1998 | Katz et al. | 360/126 |
| 5,801,910 A | 9/1998 | Mallary | 360/126 |
| 6,172,848 B1 * | 1/2001 | Santini | 360/122 |

OTHER PUBLICATIONS

U.S. Provisional application No. 60/144,269; High Frequency Response Writer With Recessed SP and Toroidal Coils; Filed Jul. 15, 1999.

* cited by examiner

*Primary Examiner*—Robert S. Tupper
(74) *Attorney, Agent, or Firm*—Kinney & Lange, P.A.

(57) ABSTRACT

A magnetic recording head having an air bearing surface comprises a writer having a substantially planar single piece top pole, a shared pole and a conductive coil. The top pole and shared pole are separated by a write gap region. A magnetic stud is positioned adjacent the write gap region near the air bearing surface. The magnetic stud provides a uniform magnetic flux supply to the write gap region. The magnetic stud has a variable height along the air bearing surface. An inner surface of the magnetic stud substantially conforms to an outer surface of the conductive coil. The shared pole includes a recess, and at least a portion of the conductive coil is positioned in the recess. The recess in the shared pole is filled with an insulator that substantially surrounds the portion of the conductive coil positioned in the recess. A capping layer is formed on the portion of the conductive coil positioned in the recess. The shared pole includes a common top surface comprising a top surface of the magnetic stud, a top surface of the insulator and a top surface of the capping layer. The common top surface is made substantially planar by chemical-mechanical polishing.

20 Claims, 5 Drawing Sheets

PLANAR WRITER FOR MERGED GMR RECORDING HEAD

CROSS-REFERENCE TO RELATED APPLICATION(S)

This application claims the benefit of the filing dates of U.S. provisional application Ser. No. 60/175,568 entitled "PLANAR WRITER FOR MERGED GMR RECORDING HEAD," which was filed Jan. 11, 2000, and of U.S. provisional application Ser. No. 60/176,168 entitled "FLAT, SHORT YOKE HIGH DATA RATE WRITER," which was filed Jan. 13, 2000.

BACKGROUND OF THE INVENTION

The present invention relates generally to the field of electronic data storage and retrieval, and in particular to an improved writer in a merged giant magnetoresistance (GMR) read/write head.

A GMR read/write head generally consists of two portions, a writer portion for storing magnetically-encoded information on a magnetic disc and a reader portion for retrieving magnetically-encoded information from the disc. The reader portion typically consists of a bottom shield, a top shield, and a giant magnetoresistive (GMR) sensor positioned between the bottom and top shields. Magnetic flux from the surface of the disc causes rotation of the magnetization vector of a free layer of the GMR sensor, which in turn causes a change in electrical resistivity of the GMR sensor. The change in resistivity of the GMR sensor can be detected by passing a current through the GMR sensor and measuring a voltage across the GMR sensor. External circuitry then converts the voltage information into an appropriate format and manipulates that information as necessary.

The writer portion typically consists of a top and a bottom pole, which are separated from each other at an air bearing surface of the writer by a gap layer, and which are connected to each other at a region distal from the air bearing surface by a back gap closer or back via. Positioned between the top and bottom poles are one or more layers of conductive coils encapsulated by insulating layers. The writer portion and the reader portion are often arranged in a merged configuration in which a shared pole serves as both the top shield in the reader portion and the bottom pole in the writer portion.

To write data to the magnetic media, an electrical current is caused to flow through the conductive coils to thereby induce a magnetic field across the write gap between the top and bottom poles. By reversing the polarity of the current through the coils, the polarity of the data written to the magnetic media is also reversed. Because the top pole is generally the trailing pole of the top and bottom poles, the top pole is used to physically write the data to the magnetic media. Accordingly, it is the top pole that defines the track width of the written data. More specifically, the track width is defined by the width of the top pole at the air bearing surface.

Prior art configurations have a distinct limitation in that the top pole is typically formed over a mound of coils, resulting in the top pole having a "bump" shape. The portion of the top pole adjacent the air bearing surface in prior art configurations is sloped. It is therefore difficult to precisely control the width of the top pole at the air bearing surface, particularly as the width necessarily becomes smaller to allow for greater data storage densities. Commonly assigned and co-pending provisional application No. 60/144,269, entitled "HIGH FREQUENCY RESPONSE WRITER WITH RECESSED SP AND TORROIDAL COILS", filed on Jul. 15, 1999, discloses an improved write head with a vertical coil configuration, wherein the bottom coil layer is embedded within a recess of the shared pole. By positioning the bottom coil layer in a recess in the shared pole, a substantially planar top pole may be formed.

In addition to positioning the coil in a recess in the shared pole as disclosed in provisional application No. 60/144,269, further improvements are desirable to produce a substantially planar top pole, and thereby allow for greater tolerance control of the width of the top pole at the air bearing surface.

BRIEF SUMMARY OF THE INVENTION

A magnetic recording head having an air bearing surface comprises a writer having a substantially planar single piece top pole, a shared pole and a conductive coil. The top pole and shared pole are separated by a write gap region. A magnetic stud is positioned adjacent the write gap region near the air bearing surface. The magnetic stud provides a uniform magnetic flux supply to the write gap region. The magnetic stud has a variable height along the air bearing surface. An inner surface of the magnetic stud substantially conforms to an outer surface of the conductive coil. The shared pole includes a recess, and at least a portion of the conductive coil is positioned in the recess. The recess in the shared pole is filled with an insulator that substantially surrounds the portion of the conductive coil positioned in the recess. A capping layer is formed on the portion of the conductive coil positioned in the recess. The shared pole includes a common top surface comprising a top surface of the magnetic stud, a top surface of the insulator and a top surface of the capping layer. The common top surface is made substantially planar by chemical-mechanical polishing (CMP).

In a preferred embodiment, the write gap region is a multi-layer insulator formed of $Al_2O_3/Si_3N_4$ or $Al_2O_3/SiO_2$. The shared pole includes a notch near the air bearing surface. The notch extends upwards from the shared pole toward the top pole, and has a width substantially the same as a width of the top pole near the air bearing surface. The notch improves the resolution of the writer.

DETAILED DESCRIPTION

Figure 1:
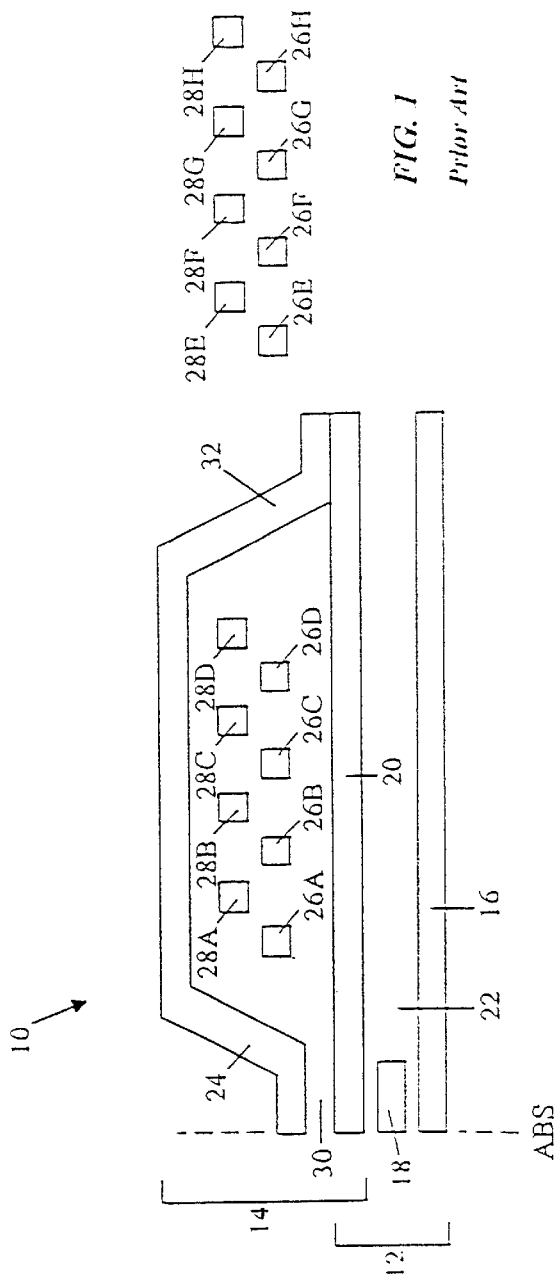
FIG. 1 is a cross-sectional view of a prior art magnetic recording head having a writer portion with pancake coils.

FIG. 1 is a cross-sectional view of prior art magnetic recording head 10 having reader portion 12 and writer portion 14. Reader portion 12 includes bottom shield 16, read element 18, shared pole 20 and read gap 22. Read element 18 is positioned between bottom shield 16 and shared pole 20 adjacent air bearing surface (ABS) of magnetic recording head 10. Shared pole 20 acts as a top shield for reader 12 and as a bottom pole for writer 14. Read gap 22 serves to isolate read element 18 from both bottom shield 16 and shared pole 20.

Writer portion 14 includes shared pole 20, top pole 24, first pancake coil layer 26 (shown in cross-section as inner coils 26A–26D and outer coils 26E–26H), second pancake coil layer 28 (shown in cross-section as inner coils 28A–28D and outer coils 28E–28H), and write gap 30.

Inner coils 26A–26D and 28A–28D are located between top pole 24 and shared pole 20. Shared pole 20 is relatively planar in shape, while top pole 24 is bump-shaped, where the bump is defined by the layering of the inner coils between top pole 24 and shared pole 20. At the ABS of magnetic recording head 10, top pole 24 is separated from shared pole 20 by write gap 30. At a region of magnetic recording head 10 distal from the ABS, top pole 24 is in direct contact with shared pole 20 at back via 32. Top pole 24 is tapered at the ABS to define a track width of the data written to the magnetic media.

First pancake coil layer 26 is one continuous coil which wraps around back via 32 in a plane substantially normal to both the ABS of magnetic recording head 10 and to the plane of the paper of FIG. 1. In one embodiment of first pancake coil layer 26, the coils may be wrapped in the following order: 26D to 26E to 26C to 26F to 26B to 26G to 26A to 26H. Similarly, second pancake coil layer 28 is a single continuous coil which wraps around back via 32 in a plane substantially normal to both the ABS of magnetic recording head 10 and to the plane of the paper of FIG. 1. In one embodiment of second pancake coil layer 28, the coils may be wrapped in the following order: 28D to 28E to 28C to 28F to 28B to 28G to 28A to 28H. To form a single coil, rather than two coils, coil 26D may be connected to coil 28D. In this configuration of the coils, coils 26H and 28H serve as contacts to which current may be provided to the single continuous coil. Each of the individual coils 26A–26H and 28A–28H are separated from one another and from top and shared poles 24 and 20 by an insulating material.

To write magnetically-encoded data to the magnetic media, an electrical current is caused to flow through coil layers 26 and 28, thereby inducing a magnetic field across write gap 30 between top and shared poles 24 and 20. By reversing the polarity of the current through coil layers 26 and 28, the polarity of the data stored to the magnetic media is reversed.

Figure 2:
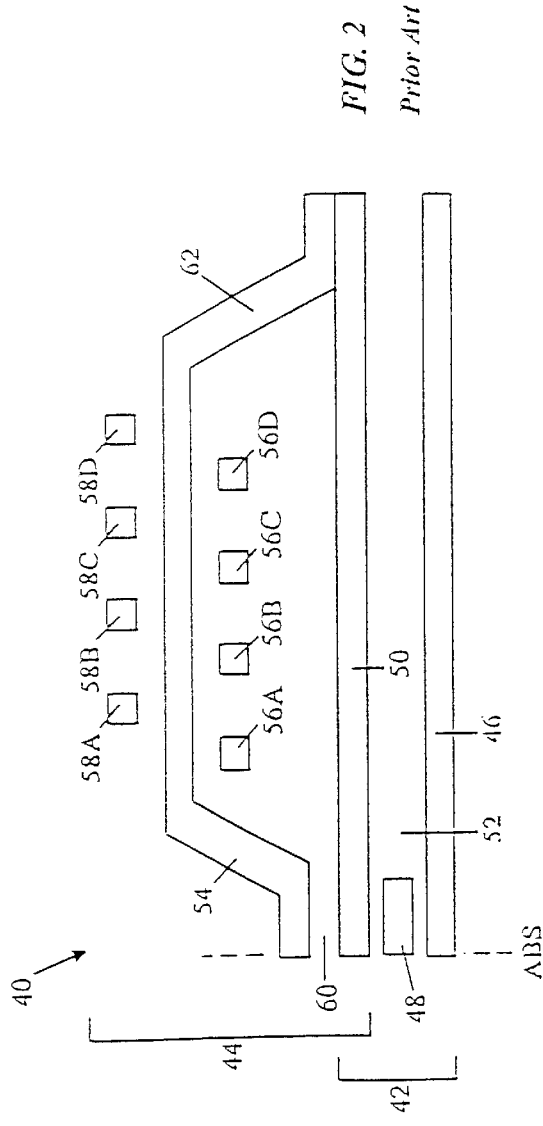
FIG. 2 is a cross-sectional view of a prior art magnetic recording head having a writer portion with vertical coils.

FIG. 2 is a cross-sectional view of prior art magnetic recording head 40 having reader portion 42 and writer portion 44. Reader portion 42 includes bottom shield 46, read element 48, shared pole 50 and read gap 52. Read element 48 is positioned between bottom shield 46 and shared pole 50 adjacent the ABS of magnetic recording head 40. Shared pole 50 acts as a top shield for reader 42 and as a bottom pole for writer 44. Read gap 52 serves to isolate read element 48 from both bottom shields 46 and shared pole 50.

Writer portion 44 includes shared pole 50, top pole 54, bottom coil layer 56 (shown in cross-section as coils 56A–56D), top coil layer 58 (shown in cross-section as coils 58A–58D), and write gap 60.

Bottom coil layer 56 is positioned between top pole 54 and shared pole 50, while top coil layer 58 is positioned on a side of top pole 54 opposite bottom coil layer 56. Shared pole 50 is relatively planar in shape, while top pole 54 is bump-shaped, the bump being defined by lower coils 56 between top pole 54 and shared pole 50. At the ABS of magnetic recording head 40, top pole 54 is separated from shared pole 50 by write gap 60. At a region of magnetic recording head 40 distal from the ABS, top pole 54 is in direct contact with shared pole 50 at back via 62. Top pole 54 is tapered at the ABS to define a track width of the data written to the magnetic media.

Bottom coil layer 56 and top coil layer 58 are joined together to form one continuous vertical coil which wraps around top pole 54 in a plane substantially normal to the plane of the paper of FIG. 2. In one embodiment of bottom and top coil layers 56 and 58, the vertical coil is wrapped in the following order: 56A to 58A to 56B to 58B to 56C to 58C to 56D to 58D, wherein coils 56A and 56D serve as contacts to which current may be provided through the vertical coil. Each of the individual coils 56A–56D and 58A–58D are separated from one another and from the top and shared poles 54 and 50 by an insulating material.

To write to the magnetic media, an electrical current is caused to flow through coil layers 56 and 58, thereby inducing a magnetic field across write gap 60 between top and shared poles 54 and 50. By reversing the polarity of the current through coil layers 56 and 58, the polarity of the data stored to the magnetic media is reversed.

Both prior art writer 10 with pancake coils and prior art writer 40 with vertical coils have a distinct limitation. In both writer 10 and writer 40, respective top pole 24 or 54 is formed over a mound of coils which results in top poles 24 and 54 having a bump shape. As described above, the track width of the written data is defined by the width of the top pole at the ABS. However, with top poles 24 and 54 both being sloped near the ABS, it is difficult to control their width at the ABS of respective magnetic recording heads 10 and 40. To allow for the continuing increases in data storage densities, better control of this critical dimension is necessary.

Figure 3:
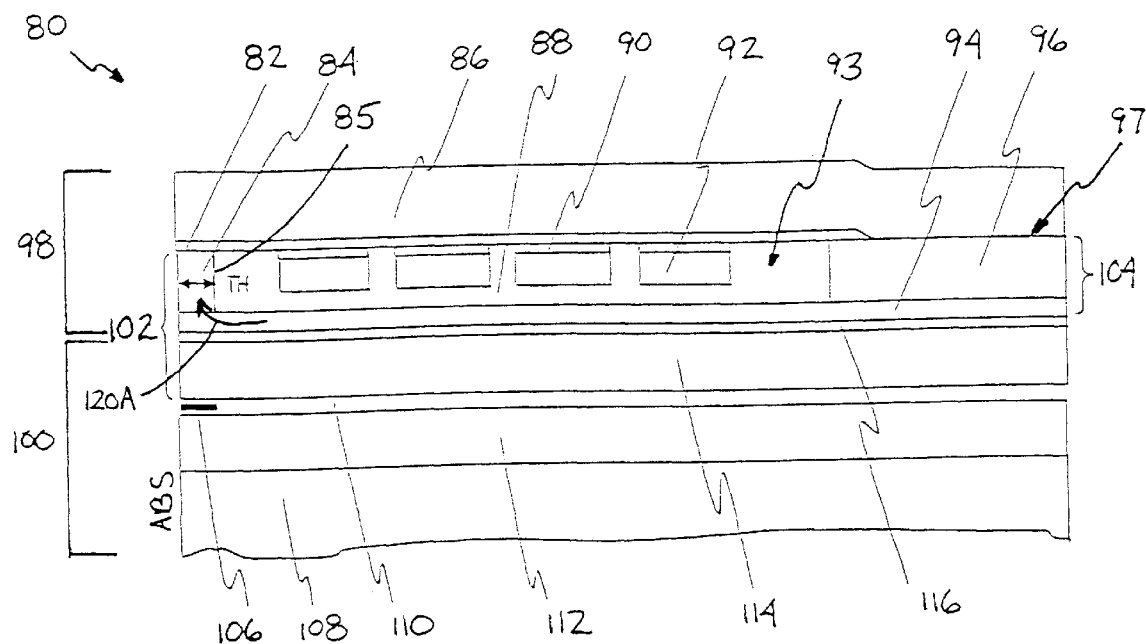
FIG. 3 is a cross-sectional view of a merged GMR read/write head according to the present invention.

FIG. 3 is a cross-sectional view of a merged GMR read/write head according to the present invention. Read/write head 80 is capable of supporting high-speed recording with submicron track width. Read/write head 80 includes reader portion 100 and planar writer portion 98. Reader portion 100 includes substrate 108, bottom shield 112, GMR sensor 106, read gap 110, and top shield 114. Bottom shield 112 is deposited on substrate 108. Bottom shield 112 and top shield 114 are preferably made of a soft magnetic material with high permeability and low magnetostriction, such as $Ni_{80}Fe_{20}$. GMR sensor 106 is positioned in read gap 110 between top shield 114 and bottom shield 112. Read gap 110 is an insulator that isolates GMR sensor 106 from top shield 114 and bottom shield 112.

Writer portion 98 is a multilayer structure that includes bottom pole 104, coil 92, write gap 82, and top pole 86. The combination of bottom pole 104, non-magnetic spacer 116 and top shield 114 is also referred to as shared pole 102. Shared pole 102 serves as a top shield for reader 100 and a bottom pole for writer 98. The three-layer structure of shared pole 102 provides high shielding and writing performance, and suppresses writer effect on reader 100. Non-magnetic spacer 116 is made of a non-magnetic insulator such as $Al_2O_3$ or $SiO_2$, or a conductor such as NiP, NiPd, and has a thickness from several dozen to several hundred nanometers. Non-magnetic spacer 116 prevents magnetic flux from propagating from writer portion 98 to reader portion 100 during recording, and enhances the magnetic stability of the sensor.

Bottom pole 104 includes bottom magnetic layer 94, front magnetic stud 84, and back gap closer 96, each of which is preferably a high moment magnetic material with low coercivity and magnetostriction, such as $Ni_{45}Fe_{55}$, CoNiFe, CoFe or FeTaN, to support recording on high coercivity media. Bottom pole 104 has a short length measured from the ABS, and underlays only a front part of coil 92, which reduces the magnetic induction of the head and enhances its performance at high frequency. A recess 93 is formed in bottom pole 104. Recess 93 is filled with a non-magnetic insulator 88, such as $Al_2O_3$. Non-magnetic insulator 88 serves as a zero throat insulator for throat height definition and improves writer efficiency. "Throat height" (TH) is the length of the pole tips measured from the ABS (i.e., the distance from the ABS to zero throat position 85). A narrow throat height is desirable in order to produce a narrow writer track width. Recess 93 is spaced from the ABS by magnetic stud 84.

Figure 4:
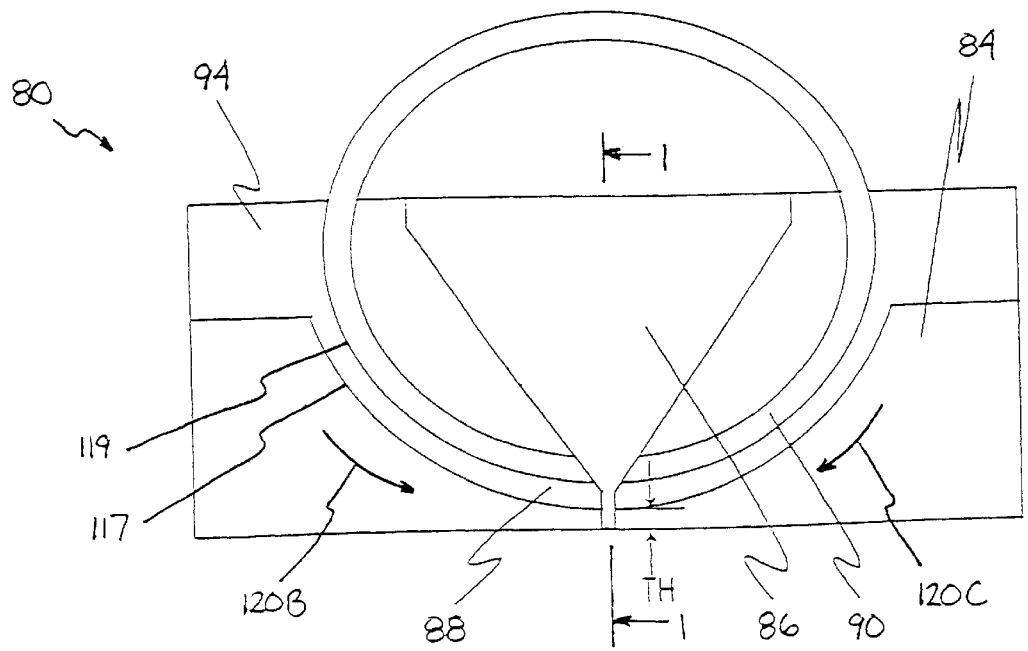
FIG. 4 shows a top view of a merged GMR read/write head according to the present invention.

Coil 92 is buried in recess 93. Coil 92 is in a pancake configuration, and encircles back gap closer 96 as shown in FIG. 4. Coil 92 is insulated from bottom pole 104 by non-magnetic insulator 88 and is insulated from top pole 86 by write gap 82. Coil 92 has a single layer structure and is placed near the ABS. Coil 92 is spaced from the ABS by magnetic stud 84. Positioning coil 92 in the vicinity of the ABS, in conjunction with using a short top pole 86, improves the writer efficiency. Coil 92 is preferably made of Cu.

Magnetic stud 84, non-magnetic insulator 88, coil 92 and back gap closer 96 include a common top surface 97. Common top surface 97 is made flat by chemical-mechanical polishing (CMP). To prevent oxidation and smearing of coil 92 during polishing of common top surface 97, coil 92 is covered by a thin cap layer 90. Cap layer 90 is preferably a nonmagnetic material having chemical and mechanical properties similar to that used for magnetic stud 84 and back gap closer 96, so that the etch rates of these materials will be approximately the same, and a smooth common top surface 97 can be obtained. In a preferred embodiment, cap layer 90 is made of a corrosion resistive and non-magnetic metal or alloy, such as NiPd or NiP. Write gap 82 is formed of a multi-layer insulator such as $Al_2O_3/Si_3N_4$ or $Al_2O_3/SiO_2$ to provide insulation of coil 92 from top pole 86. The use of a multi-layer for write gap 82 helps to prevent electro-static discharge in writer 98.

Top pole 86 is formed over flat polished surface 97. The planar and single piece structure of top pole 86 allows regular photolithography to be used to pattern top pole 86 to a submicron width near the ABS, and facilitates precise control of a long saturation region of top pole 86 (see FIG. 4). The planar and single piece structure of top pole 86 considerably enhances resolution of the photolithography. As a result, the geometry of top pole 86 can be controlled with high accuracy and a submicron writer width can be achieved by using photo technology. When top pole 86 is "bubble shaped" rather than substantially planar, a thick photoresist with a very high aspect ratio of the photoresist thickness to the desired pattern width must be used, which limits the resolution of the process. The planar structure of top pole 86 gives several additional advantages, such as a reduction of the magnetic core length and decreased switching time, controlled domain structure, the suppression of eddy currents by being able to use sputtered magnetic materials with high magnetic moment and resistivity or laminates for top pole 86, suppression of the writer sensitivity to the write current, simplified technology and enhanced yield. These advantages are important for achieving high-speed recording. Top pole 86 is made of a high moment magnetic material with low coercivity and magnetostriction, high permeability and electrical resistivity, such as $Ni_{45}Fe_{55}$, CoFe, CoNiFe and FeTaN. Top pole 86 preferably has a multilayer structure with the higher magnetic moment material placed adjacent to write gap 82.

FIG. 4 shows a top view of a merged GMR read/write head according to the present invention. The cross-sectional view shown in FIG. 3 is viewed from the perspective of section lines 1—1 in FIG. 4.

As shown in FIG. 4, magnetic stud 84 has a flared shape that narrows to the throat height (TH) value near the center of read/write head 80 and broadens at the edges of read/write head 80. Thus, magnetic stud 84 has a variable height along the ABS. Inner surface 117 of magnetic stud 84 resembles the shape of the adjacent outer surface 119 of coil 92 (positioned under cap layer 90), improving the magnetic coupling between coil 92 and magnetic stud 84. Such a shape of magnetic stud 84 enhances efficiency of writer 98 by providing a more uniform magnetic flux supply to write gap region 82 from three directions: from the bottom of write gap region 82 (as represented by arrow 120A in FIG. 3) and from both sides of write gap region 82 (as represented by arrows 120B and 120C in FIG. 4). The shape of magnetic stud 84 improves the magnetic coupling between magnetic stud 84 and coil 92. The shape of magnetic stud 84 also improves adhesion of magnetic stud 84 to bottom pole 104 and helps prevent delamination of magnetic stud 84 from bottom magnetic layer 94 during lapping. Further, the shape of magnetic stud 84 helps to suppress domain formation in write gap 82 and improves the magnetic stability of the GMR sensor.

Top pole 86 is patterned to a submicron width near the ABS, and broadens away from the ABS. The points at which top pole 86 changes in width are referred to as "breakpoints". Because of the planar and single-piece structure of top pole 86, the size of the various regions of top pole 86 defined by breakpoints may be precisely controlled.

Figure 5:
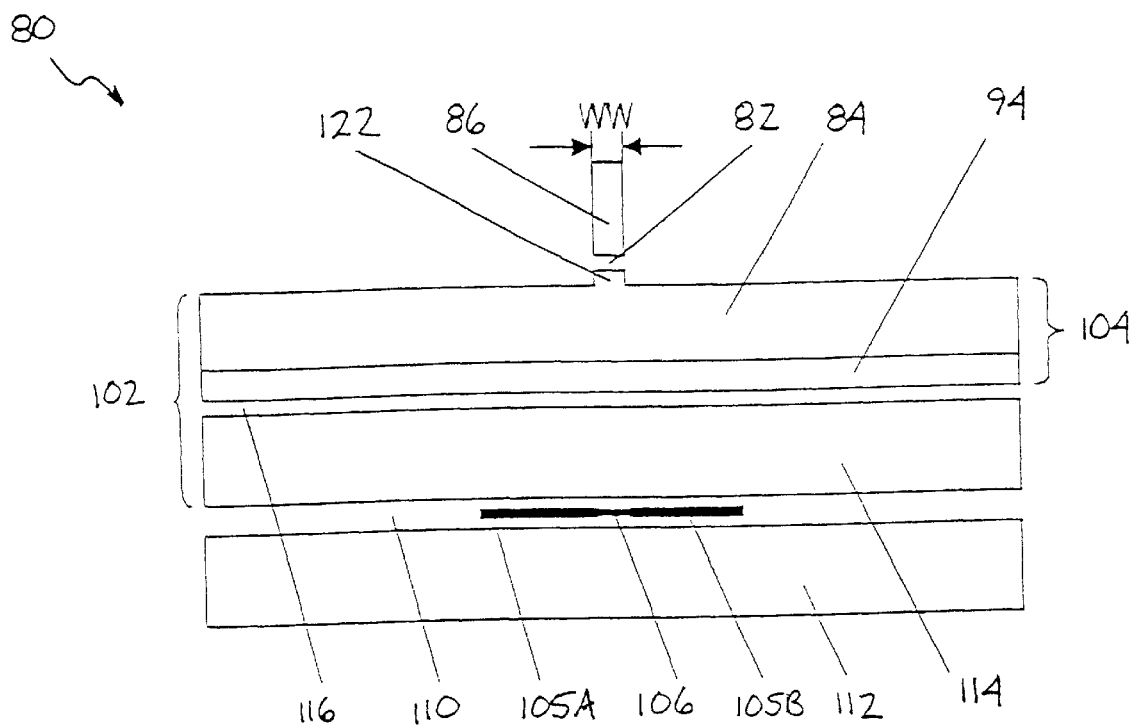
FIG. 5 shows a front view of a merged GMR read/write head according to the present invention.

FIG. 5 shows a front view of a merged GMR read/write head according to the present invention. Read/write head 80 in FIG. 5 is viewed from the perspective of a disc looking at the ABS of head 80. Conductor leads 105A and 105B are coupled to GMR sensor 106. Writer portion 98 includes notch 122 formed on a top surface of magnetic stud 84. Notch 122 improves the track resolution of writer portion 98. The width of notch 122 is equal to the width of top pole 86 in write gap area 82 adjacent the ABS (i.e., writer width or WW). Notch 122 is made of a high moment material to enhance writer performance.

Figure 6:
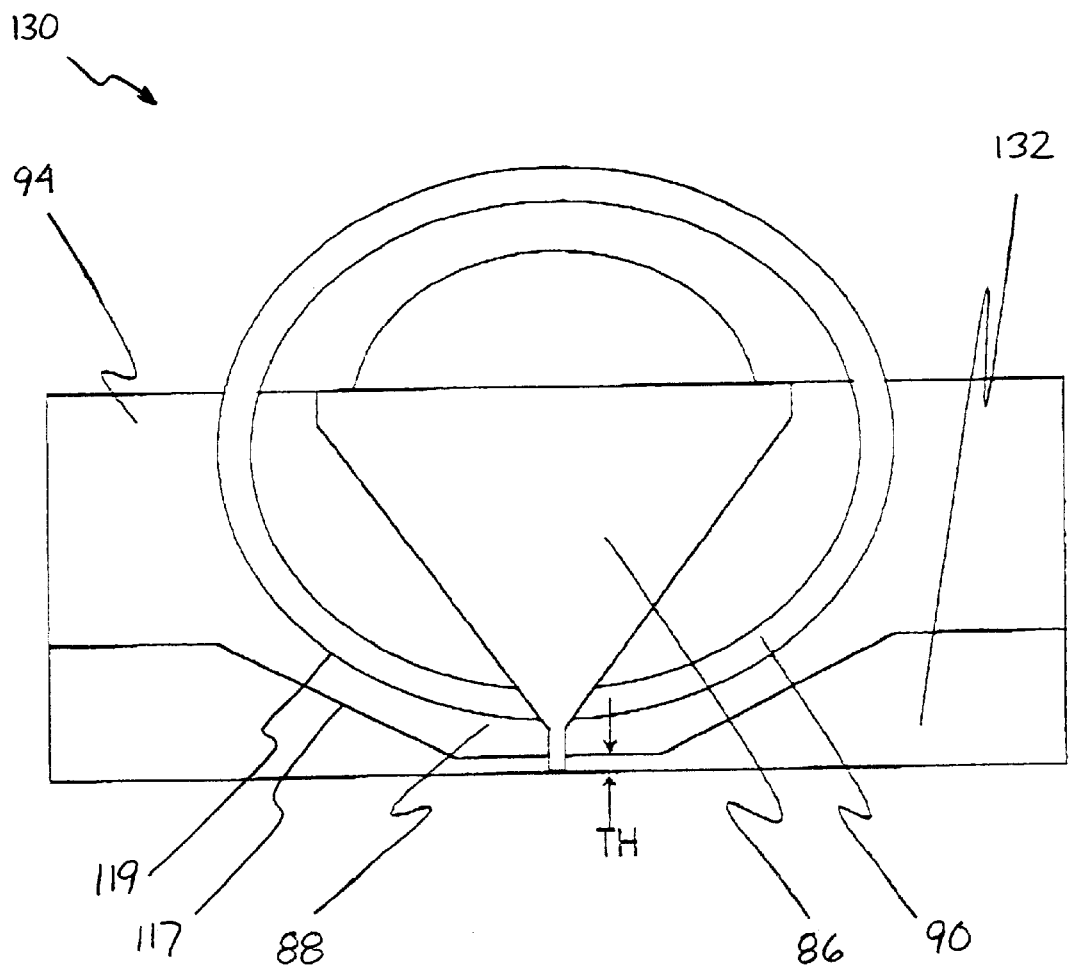
FIG. 6 shows a top view of a merged GMR read/write head according to another embodiment of the present invention.

FIG. 6 shows a top view of a merged GMR read/write head according to another embodiment of the present invention. Read/write head 130 includes magnetic stud 132, which has a different shape than magnetic stud 84 (shown in FIG. 4). Like magnetic stud 84, magnetic stud 132 has a variable height along the ABS, and inner surface 117 of magnetic stud 132 substantially resembles the shape of the adjacent outer surface 119 of coil 92 (positioned under cap layer 90), improving the magnetic coupling between coil 92 and magnetic stud 132.

Figure 7:
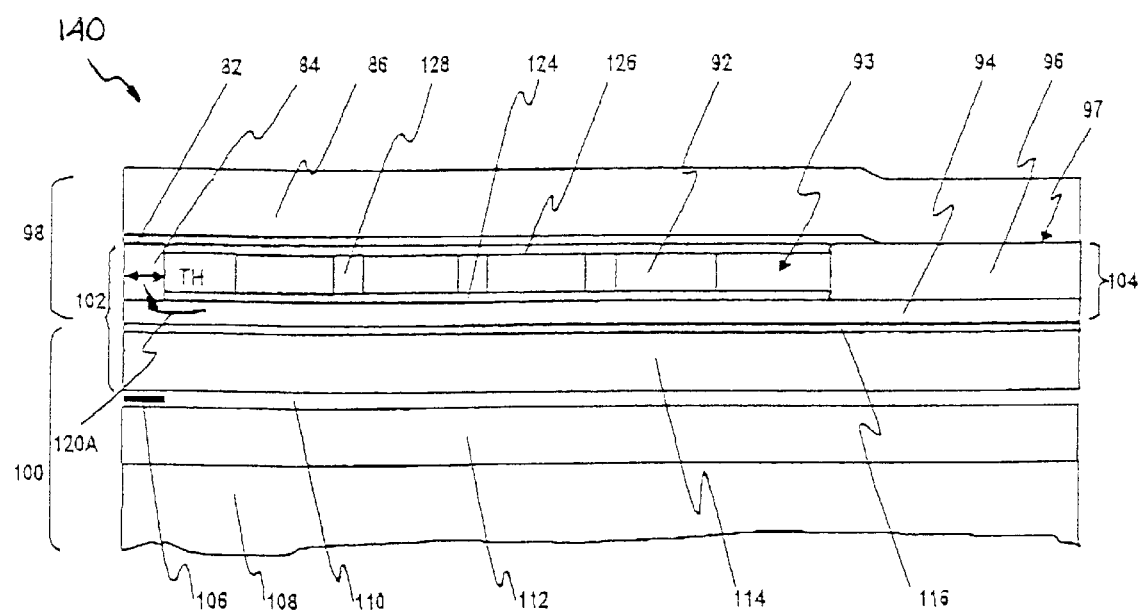
FIG. 7 shows a cross-sectional view of another embodiment of a merged GMR read/write head according to the present invention, with a modified insulating structure.

FIG. 7 shows a cross-sectional view of another embodiment of a merged GMR read/write head according to the present invention. GMR head 140 is similar to GMR head 80, shown in FIG. 3, but includes a different insulating structure. GMR head 140 includes insulators 124, 126 and 128. Insulator 124, which is preferably made of sputtered $Al_2O_3$, $Si_3N_4$, $SiO_2$, or similar material, is formed over magnetic layer 94. The turns of coil 92 are insulated from each other by insulator 128, which is preferably an organic insulator such as cured photoresist or similar insulator. Insulator 126, which is preferably made of sputtered $Al_2O_3$, $Si_3N_4$, $SiO_2$, or similar material, is formed over coil 92 and insulator 128. Insulator 126 is exposed to CMP to form a common planar surface 97 with magnetic stud 84 and back gap closer 96.

Although the present invention has been described with reference to preferred embodiments, workers skilled in the art will recognize that changes may be made in form and detail without departing from the spirit and scope of the invention.

What is claimed is:

1. A magnetic recording head having an air bearing surface, the magnetic recording head comprising:

a writer having a top pole, a shared pole layer, a conductive coil, and a write gap layer; and magnetic stud means, coupled to the shared pole layer and positioned between the shared pole layer and the write gap layer near the air bearing surface, for providing a uniform magnetic flux supply to a write gap region between a top pole tip of the top pole and the magnetic stud means, the magnetic stud means having a greater width at the air bearing surface than the top pole tip.

2. The magnetic recording head of claim 1 wherein the magnetic stud means has a height that is less at the write gap region than on opposite sides of the write gap region.

3. The magnetic recording head of claim 1 wherein the top pole is substantially planar.

4. The magnetic recording head of claim 3 wherein the top pole is a single piece structure.

5. The magnetic recording head of claim 4 wherein the top pole tip has a width of less than one micron near the air bearing surface.

6. The magnetic recording head of claim 1 wherein the shared pole layer and the magnetic stud means define a recess, and at least a portion of the conductive coil is positioned in the recess.

7. The magnetic recording head of claim 6 wherein the recess is filled with an insulator that substantially surrounds the portion of the conductive coil positioned in the recess.

8. The magnetic recording head of claim 7 wherein a capping layer is formed on the portion of the conductive coil positioned in the recess.

9. The magnetic recording head of claim 8 wherein the capping layer is formed of a non-magnetic, corrosion resistive material.

10. The magnetic recording head of claim 8 wherein the write gap layer overlies a common top surface comprising a top surface of the magnetic stud means, a top surface of the insulator and a top surface of the capping layer, and wherein the common top surface is made substantially planar by chemical-mechanical polishing.

11. The magnetic recording head of claim 1 wherein at least a portion of the conductive coil is positioned near the air bearing surface.

12. The magnetic recording head of claim 1 wherein the write gap layer is a multi-layer insulator.

13. The magnetic recording head of claim 12 wherein the write gap layer is formed of one of $Al_2O_3/Si_3N_4$ and $Al_2O_3/SiO_2$.

14. The magnetic recording head of claim 1 wherein the magnetic stud means is one of $Ni_{45}Fe_{55}$, CoNiFe, CoFe and FeTaN.

15. The magnetic recording head of claim 1 wherein the magnetic stud means includes a notch near the air bearing surface, the notch extending upwards from the magnetic stud means toward the top pole tip, the notch having a width substantially the same as a width of the top pole tip near the air bearing surface.

16. The magnetic recording head of claim 1 wherein an inner surface of the magnetic stud means substantially conforms to an outer surface of the conductive coil.

17. A magnetic recording head having an air bearing surface comprising:

a substantially planar top pole having a top pole tip at the air bearing surface;

bottom pole layer;

a magnetic stud connected to the bottom pole layer and positioned between the bottom pole layer and the top pole near the air bearing surface, the magnetic stud having a width that is greater than a width of the top pole tip and having a height measured in a direction perpendicular to the air bearing surface that is greater on opposite sides of the top pole tip than at the top pole tip;

a substantially planar write gap layer underlying the top pole and having a position located between the top pole tip and the magnetic stud; and a conductive coil having a first coil portion positioned between the top pole and the bottom pole layer.

18. The magnetic recording head of claim 17 wherein the first coil portion is positioned within a recess defined by the bottom pole layer and the magnetic stud.

19. The magnetic recording head of claim 17 wherein an inner surface of the magnetic stud substantially conforms to an outer surface of the conductive coil.

20. The magnetic recording head of claim 17 wherein the top pole tip has a width of less than one micron near the air bearing surface.

* * * * *